US008695918B2

(12) United States Patent
Jarrett et al.

(10) Patent No.: US 8,695,918 B2
(45) Date of Patent: Apr. 15, 2014

(54) BEARING RESTRAINT FOR ROTOR SYSTEMS

(75) Inventors: Chad L. Jarrett, Arlington, TX (US); Frank B. Stamps, Colleyville, TX (US); Mark Wiinikka, Hurst, TX (US); Scott Hemmen, Hurst, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 261 days.

(21) Appl. No.: 13/346,912

(22) Filed: Jan. 10, 2012

(65) Prior Publication Data
US 2013/0175384 A1 Jul. 11, 2013

(51) Int. Cl.
*B64C 27/00* (2006.01)

(52) U.S. Cl.
USPC .................................. 244/17.11; 416/135

(58) Field of Classification Search
USPC ............. 244/17.11, 17.27; 416/135, 136, 137
See application file for complete search history.

(56) References Cited

U.S. PATENT DOCUMENTS

| | | | | |
|---|---|---|---|---|
| 3,111,172 A | * | 11/1963 | Gorndt et al. | 403/225 |
| 3,652,185 A | * | 3/1972 | Cresap et al. | 416/134 R |
| 3,843,282 A | * | 10/1974 | Nagler | 416/20 R |
| 3,942,910 A | * | 3/1976 | Snyder et al. | 416/141 |
| 4,407,633 A | | 10/1983 | Mouille | 416/140 |
| 4,430,045 A | * | 2/1984 | Cresap | 416/138 |
| 4,432,696 A | * | 2/1984 | Stephan et al. | 416/134 A |
| 4,516,909 A | | 5/1985 | Caramaschi et al. | 416/134 |
| 4,732,540 A | | 3/1988 | Mouille et al. | 416/140 |
| 5,213,470 A | * | 5/1993 | Lundquist | 416/9 |
| 5,293,974 A | * | 3/1994 | Bietenhader et al. | 188/379 |
| 6,499,690 B1 | * | 12/2002 | Katayama et al. | 244/17.11 |

FOREIGN PATENT DOCUMENTS

| | | | | |
|---|---|---|---|---|
| GB | 2 030 099 | | 8/1979 | B64C 27/48 |
| GB | 2 041 310 | | 1/1980 | B64C 27/48 |
| GB | 2 139 171 | | 4/1984 | B64C 27/48 |

OTHER PUBLICATIONS

Extended European Search Report; Application No. 12155995.9-2422; pp. 6, Aug. 2, 2012.

* cited by examiner

*Primary Examiner* — Tien Dinh
*Assistant Examiner* — Keith L Dixon
(74) *Attorney, Agent, or Firm* — Baker Botts L.L.P.

(57) ABSTRACT

According to one embodiment, a rotor system comprises a yoke, a grip, an elastomeric bearing, and a bearing restraint. The grip is positioned around a portion of the yoke and has both a closed end and an open end. The elastomeric bearing is coupled to the closed end of the grip and located between the closed end and the yoke. The bearing restraint is coupled to the grip between the yoke and the open end at a distance from the closed end such that the yoke contacts the bearing restraint when the rotor system is subject to a first centrifugal force but does not contact the bearing restraint when the rotor system is subject to a second centrifugal force greater than the first centrifugal force.

20 Claims, 4 Drawing Sheets

FIG. 6A

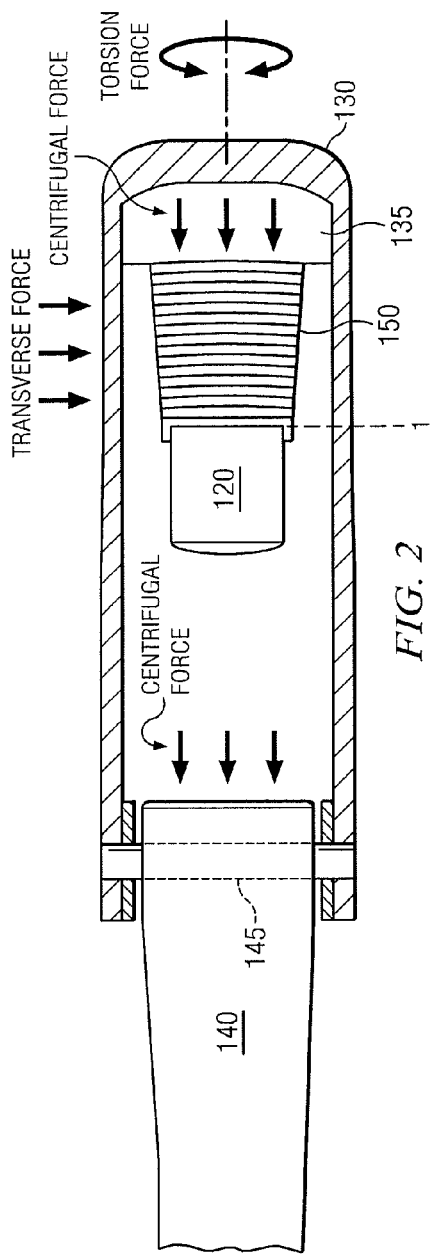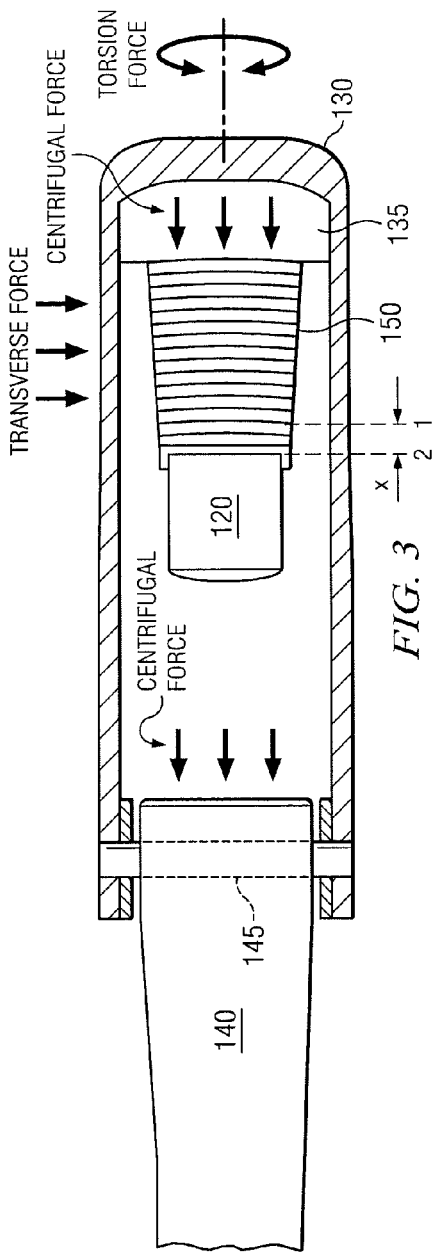

BEARING RESTRAINT FOR ROTOR SYSTEMS

TECHNICAL FIELD

This invention relates generally to rotor systems, and more particularly, to a bearing restraint for a rotor system.

BACKGROUND

A helicopter may include one or more rotor systems. One example of a helicopter rotor system is a main rotor system. A main rotor system may generate aerodynamic lift to support the weight of the helicopter in flight and thrust to counteract aerodynamic drag and move the helicopter in forward flight. Another example of a helicopter rotor system is a tail rotor system. A tail rotor system may generate thrust in the same direction as the main rotor system's rotation to counter the torque effect created by the main rotor system. A rotor system may include one or more pitch links to rotate, deflect, and/or adjust rotor blades.

SUMMARY

According to one embodiment, a rotor system comprises a yoke, a grip, an elastomeric bearing, and a bearing restraint. The grip is positioned around a portion of the yoke and has both a closed end and an open end. The elastomeric bearing is coupled to the closed end of the grip and located between the closed end and the yoke. The bearing restraint is coupled to the grip between the yoke and the open end at a distance from the closed end such that the yoke contacts the bearing restraint when the rotor system is subject to a first centrifugal force but does not contact the bearing restraint when the rotor system is subject to a second centrifugal force greater than the first centrifugal force Particular embodiments of the present disclosure may provide one or more technical advantages. A technical advantage of one embodiment may include the capability to use elastomeric materials in rotor system grips while protecting against cord and beam shears. A technical advantage of one embodiment may also include the capability to prevent an elastomeric bearing of a rotor grip from going into tension and from becoming column unstable. A technical advantage of one embodiment may include the ability to keep the elastomeric bearing in compression during all modes of operation of the rotor system. A technical advantage of one embodiment may include the capability to improve the strength and working life of an elastomeric bearing in a rotor system grip.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIGS. 2 and 3 show a cross-section of a grip of the rotor system of FIG. 1 without a bearing restraint;

FIG. 2 shows a cross-section of a grip of FIG. 1 during high-speed operation of the rotor system of FIG. 1;

FIG. 3 shows a cross-section of a grip of FIG. 1 during low-speed operation of the rotor system of FIG. 1;

FIG. 4 shows a cross-section of a grip of FIG. 1 during high-speed operation of the rotor system of FIG. 1;

FIG. 5 shows a cross-section of a grip of FIG. 1 during low-speed operation of the rotor system of FIG. 1;

DETAILED DESCRIPTION OF THE DRAWINGS

Figure 1:
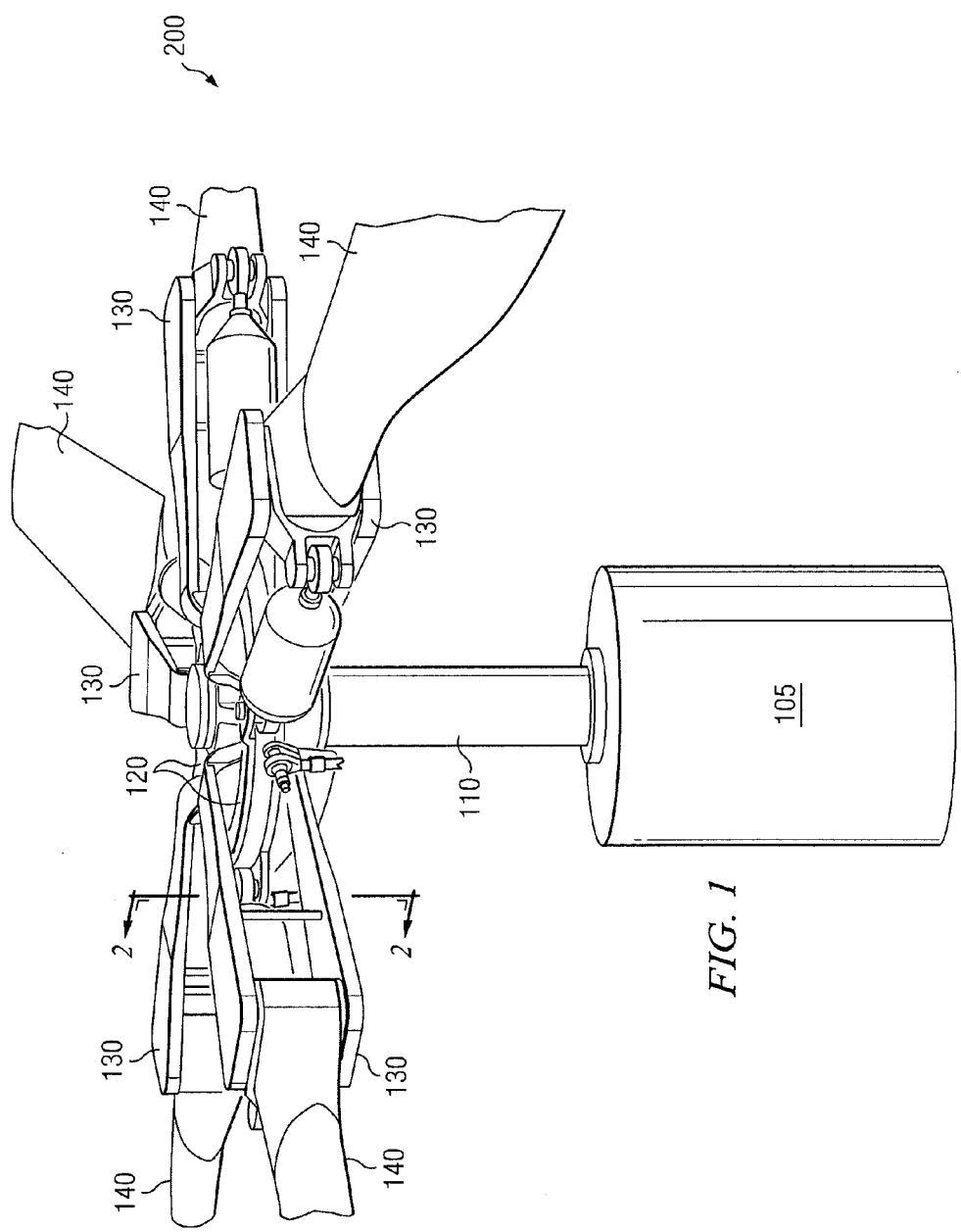
FIG. 1 shows a rotor system according to one example embodiment.

FIG. 1 shows a rotor system 100 according to one example embodiment. Rotor system 100 features a drive train 105, a drive shaft 110, a yoke 120, grips 130, and blades 140. In some examples, rotor system 100 may include more or fewer components. For example, FIG. 1 does not show components such as a gearbox, a swash plate, drive links, drive levers, and other components that may be incorporated.

Power train 105, drive shaft 110, and yoke 120 are mechanical components for generating and transmitting torque and rotation. Power train 105 may include a variety of components, including an engine, a transmission, and differentials. In operation, drive shaft 110 receives torque or rotational energy from power train 105 and rotates yoke 120. Blades 140 are coupled to yoke 120 by grips 130. Rotation of yoke 120 causes grips 130 and blades 140 to rotate about drive shaft 110.

As will be explained in greater detail below, grips 130 and blades 140 may be subject to a variety of different forces. For example, rotation of grips 130 and blades 140 may result in a centrifugal force against grips 130 and blades 140 in a direction away from drive shaft 110. In addition, the weight of grip 130 and blade 140 may result in a transverse force being applied against grip 130.

In some circumstances, the centrifugal force may be much larger than the transverse force such that the centrifugal force renders the transverse force negligible. In other circumstances, however, the centrifugal force becomes smaller while the transverse force remains the same. In these circumstances, the transverse force may cause damage to bearings within grips 130. Teachings of certain embodiments recognize the ability to protect certain bearings within grip 130 from transverse forces.

Figure 4:
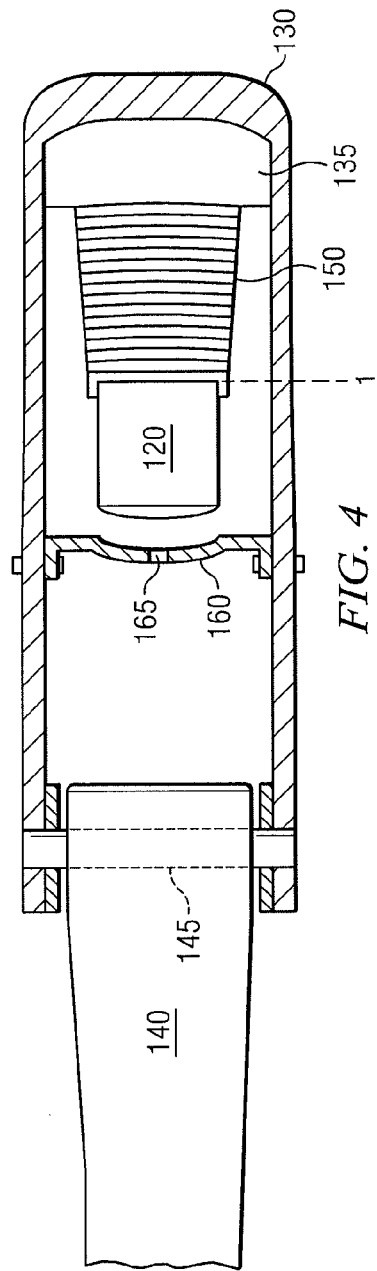
FIGS. 4 and 5 show a cross-section of a grip of the rotor system of FIG. 1 with a bearing restraint.
Figure 5:
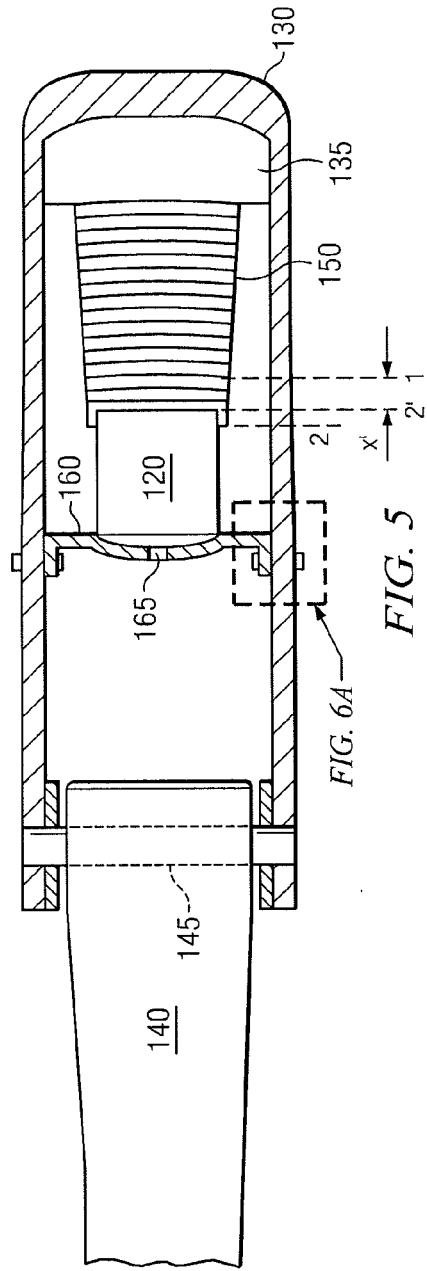

FIGS. 2-5 show a cross-section of a grip 130 of FIG. 1 during operation of rotor system 100. In FIGS. 2-5, an elastomeric bearing 150 is situated between grip 130 and yoke 120. As will be explained in greater detail below, a bearing restraint 160 may help protect elastomeric bearing 150. FIGS. 2 and 3 show the cross-section of grip 130 without bearing restraint 160, and FIGS. 4 and 5 show the cross-section of grip 130 with bearing restraint 160.

FIGS. 2 and 3 show a cross-section of a grip 130 of FIG. 1 during operation of rotor system 100. FIG. 2 shows the cross-section of grip 130 of FIG. 1 during high-speed operation of rotor system 100, and FIG. 3 shows the cross-section of grip 130 of FIG. 1 during low-speed operation of rotor system 100. Rotor system 100 may operate in a high-speed mode, for example, if rotor system 100 is a main helicopter rotor operating during normal flight. Rotor system 100 may operate in a low-speed mode, for example, if rotor system 100 is a helicopter tilt rotor transitioning between vertical and horizontal flight.

Although the phrases "high-speed" and "low-speed" are used to describe operation of rotor system 100 in FIGS. 2 and 3, these terms merely describe the relationship between FIGS. 2 and 3. Thus, FIG. 2 shows rotor system 100 operating at a rotational speed greater than the rotational speed shown in FIG. 3, and FIG. 3 shows rotation system 100 operating a rotational speed less than the rotational speed shown in FIG. 2.

As shown in FIGS. 2 and 3, blade pin 145 couples blade 140 to grip 130. In addition, bearing mount 135 and elastomeric bearing 150 separate yoke 120 from grip 130.

Bearing mount 135 provides a surface for supporting elastomeric bearing 150. In some embodiments, bearing mount 135 is formed from a metallic material such as titanium.

Elastomeric bearing 150 separates bearing mount 135 from yoke 120. Elastomeric bearing 150 is formed from an elastomeric material. An elastomeric material is a material, such as a polymer, having the property of viscoelasticity (colloquially, "elasticity"). An example of an elastomeric material is rubber. Elastomeric materials generally have a low Young's modulus and a high yield strain when compared to other materials. Elastomeric materials are typically thermosets having long polymer chains that cross-link during curing (i.e., vulcanizing). Elastomeric materials may absorb energy during compression but may also be prone failure during tension and torsion.

In operation, elastomeric bearing 150 may be subject to centrifugal forces, transverse forces, and torsion forces. For example, rotation of blade 140 about driveshaft 110 results in a centrifugal force against blade pin 145 in a direction away from driveshaft 110. Blade pin 145 transfers the centrifugal force to grip 130, which then transfers the centrifugal force to elastomeric bearing 150 through bearing mount 135. Because elastomeric bearing 150 is positioned between bearing mount 135 and yoke 120, the centrifugal force caused by rotation of blade 140 results in compression of elastomeric bearing 150.

Elastomeric bearing 150 may have a cross-sectional area that increases from yoke 120 to bearing mount 135. In operation, elastomeric bearing 150 may be subject to compression between yoke 120 and bearing mount 135. Having an increasing cross-sectional area may allow elastomeric bearing 150 to absorb and dissipate compression forces.

Elastomeric bearing 150 is also subject to transverse and torsion forces. For example, the weight of grip 130 and blade 140 results in a transverse force being applied against elastomeric bearing 150. In addition, twisting of grip 130 and blade 140 during operation may result in a torsion force being applied to elastomeric bearing 150.

As stated above, FIG. 2 shows the cross-section of grip 130 of FIG. 1 during high-speed operation of rotor system 100, and FIG. 3 shows the cross-section of grip 130 of FIG. 1 during low-speed operation of rotor system 100.

During high-speed operation of rotor system 100, as shown in FIG. 2, compression of elastomeric bearing 150 causes the boundary between yoke 120 and elastomeric bearing 150 to align with a position 1 on grip 130, as shown in FIG. 2. Position 1 will be referred to with regard to FIGS. 3-5.

During high-speed operation, the centrifugal force may be much larger than the transverse and torsion forces. In some circumstances, the transverse and torsion forces may be negligible when compared to the large centrifugal force. Furthermore, elastomeric bearing 150 may be well-suited to absorb forces during high-speed operation because, as stated above, elastomeric material may perform better during compression than during tension.

During low-speed operation, however, the centrifugal force may be smaller while the transverse force may stay the same. Elastomeric bearing 150 is subject to a smaller centrifugal force in FIG. 3 than shown in FIG. 2. Therefore, elastomeric bearing 150 does not compress as far in FIG. 3 as in FIG. 2.

FIG. 3 illustrates this difference in compression forces. In FIG. 3, compression of elastomeric bearing 150 causes the boundary between yoke 120 and elastomeric bearing 150 to align with a position 2 on grip 130, which is a distance x from position 1. Distance x represents the difference in compression of elastomeric bearing 150 between the high-speed mode of FIG. 2 and the low-speed mode of FIG. 3. In some embodiments, distance x may be approximately 0.10 inches.

As stated above, elastomeric materials may not perform well during tension. In the example of FIG. 3, elastomeric bearing 150 may be in tension when elastomeric bearing 150 extends to position 2 during low-speed operation. In some circumstances, elastomeric bearing 150 may fail when extended to position 2 because elastomeric bearing 150 is no longer strong enough to withstand the transverse forces. For example, elastomeric bearing 150 may become column unstable when extended to position 2. Accordingly, teachings of certain embodiments recognize the ability to prevent elastomeric bearing 150 from extending to position 2.

FIGS. 4 and 5 show a cross-section of a grip 130 having a bearing restraint 160 during operation of rotor system 100. Bearing restraint 160 may prevent elastomeric bearing 150 from extending to position 2. Bearing restraint 160 may be made of any suitable material, such as titanium or other metals. Bearing restraint 160 may also have a bearing surface made from a polytetraflouroethylene material such as a Teflon. The bearing surface may reduce friction between bearing restraint 160 and yoke 120. In some embodiments, bearing restraint 160 may include a drain hole 165 for servicing bearing restraint 160 and for reducing condensation in bearing restraint 160.

FIG. 4 shows the cross-section of grip 130 during high-speed operation of rotor system 100, and FIG. 5 shows the cross-section of grip 130 during low-speed operation of rotor system 100. Although the phrases "high-speed" and "low-speed" are used to describe operation of rotor system 100 in FIGS. 4 and 5, these terms merely describe the relationship between FIGS. 4 and 5. Thus, FIG. 4 shows rotor system 100 operating at a rotational speed greater than the rotational speed shown in FIG. 5, and FIG. 5 shows rotation system 100 operating a rotational speed less than the rotational speed shown in FIG. 4.

During high-speed operation, as shown in FIG. 4, compression of elastomeric bearing 150 causes the boundary between yoke 120 and elastomeric bearing 150 to align with position 1 on grip 130, just as before in FIG. 2. Bearing restraint 160 is positioned on grip 130 such that bearing restraint 160 does not contact yoke 120 during high-speed operation. Thus, in some embodiments, bearing restraint 160 does not change the performance of elastomeric bearing 150 during high-speed operation.

During low-speed operation, however, the centrifugal force may be smaller while the transverse force may stay the same. Elastomeric bearing 150 is subject to a smaller centrifugal force in FIG. 5 than shown in FIG. 4. Therefore, elastomeric bearing 150 does not compress as far in FIG. 5 as in FIG. 4.

Bearing restraint 160, however, prevents elastomeric bearing 150 from extending to position 2 during low-speed operation, as shown in FIG. 5. In FIG. 3, bearing restraint 160 contacts yoke 120 when the boundary between yoke 120 and elastomeric bearing 150 aligns with a position 2' on grip 130, which is a distance x' from position 1. The distance x' of FIG. 5 is shorter than the distance x of FIG. 3, indicating that bearing restraint 160 prevents extension of elastomeric bearing 150 during low-speed operation.

Teachings of certain embodiments recognize that preventing extension of elastomeric bearing 150 during low-speed operation may improve the ability of elastomeric bearing 150 to withstand the transverse forces. Bearing restraint 160 may also prevent elastomeric bearing 150 from being pulled into tension during low-speed operation, which may improve both the strength and working life of elastomeric bearing 150. Bearing restraint 160 may prevent column instability of elastomeric bearing 150 and may allow the use of elastomeric bearing 150 in circumstances that would normally result in column instability without bearing restraint 160. In addition, bearing restraint 160 may allow elastomeric bearing 150 to be in compression during all modes of operation.

Figure 6A:
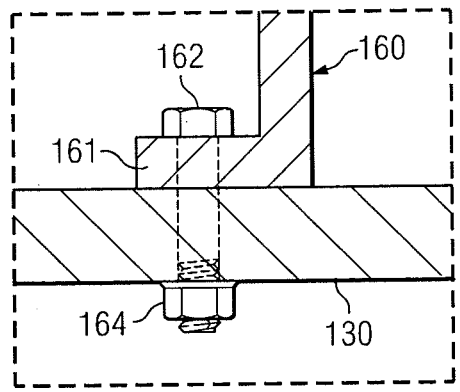
FIG. 6A shows a close view of a connection between the grip and the bearing restraint of FIG. 5 according to one example embodiment.

FIG. 6A shows a close view of a connection between grip 130 and bearing restraint 160 according to one example embodiment. In this example, bearing restraint 160 includes a flange 161 positioned against the inner surface of grip 130. Bolt 162 passes through holes in flange 161 and grip 130 and fastens to a nut 164. Fastening bolt 162 to nut 164 may secure bearing restraint 160 to grip 130.

Figure 6B:
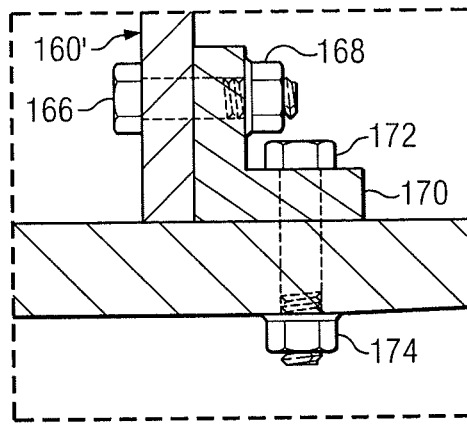
FIG. 6B shows a close view of a connection between the grip and the bearing restraint of FIG. 5 according to an alternative embodiment.

FIG. 6B shows an alternative embodiment of a connection between grip 130 and a bearing restraint 160' according to one example embodiment. Bearing restraint 160' resembles bearing restraint 160 except that bearing restraint 160' does not include flange 161. In this example, a mounting bracket 170 is positioned against grip 130 and bearing restraint 160'. Bolt 166 passes through holes in bearing restraint 160' and mounting bracket 170 and fastens to a nut 168. Bolt 172 passes through holes in mounting bracket 170 and grip 130 and fastens to a nut 174. Fastening bolt 162 to nut 168 and fastening bolt 172 to nut 174 may secure bearing restraint 160 to grip 130.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

What is claimed is:

1. A rotor system, comprising:
a yoke;
a grip positioned around a portion of the yoke, the grip having a closed end and an open end;
an elastomeric bearing coupled to the closed end of the grip and located between the closed end and the yoke; and
a bearing restraint coupled to the grip between the yoke and the open end at a distance from the closed end such that the yoke contacts the bearing restraint when the rotor system is subject to a first centrifugal force but does not contact the bearing restraint when the rotor system is subject to a second centrifugal force greater than the first centrifugal force.

2. The rotor system of claim 1, the bearing restraint comprising a polytetraflouroethylene surface facing the yoke such that the yoke contacts the polytetraflouroethylene surface when the rotor system is subject to the first centrifugal force.

3. The rotor system of claim 1, further comprising at least one bolt coupling the bearing restraint to the grip.

4. The rotor system of claim 1, further comprising:
a mounting bracket;
a first bolt coupling the mounting bracket to the grip; and
a second bolt coupling the bearing restraint to the mounting bracket.

5. The rotor system of claim 1, wherein the second bolt couples the bearing restraint to the mounting bracket in a direction substantially parallel with the first centrifugal force.

6. The rotor system of claim 1, the bearing restraint further comprising a drain hole, the drain hole operable to reduce condensation in the bearing restraint.

7. The rotor system of claim 1, further comprising:
a rotor blade; and
at least one blade pin coupling the rotor blade to the grip.

8. The rotor system of claim 1, wherein:
the elastomeric bearing has a length measured from the closed end to the yoke; and
the length of the elastomeric bearing is greater when subjecting the grip to the first centrifugal force than when subjecting the grip to the second centrifugal force.

9. A method for preventing destabilization of an elastomeric bearing in a rotor system, comprising:
providing a rotor system having:
a grip positioned around a portion of a yoke, the grip having a closed end and an open end;
an elastomeric bearing coupled to the closed end of the grip and located between the closed end and the yoke; and
a bearing restraint coupled to the grip between the yoke and the open end;
subjecting the grip to a first centrifugal force such that the yoke contacts the bearing restraint; and
subjecting the grip to a second centrifugal force greater than the first centrifugal force, wherein the bearing restraint is coupled to the grip at a distance from the closed end such subjecting the yoke to the second centrifugal force does not cause the yoke to contact the bearing restraint.

10. The method of claim 9, wherein:
the elastomeric bearing has a length measured from the closed end to the yoke; and
the length of the elastomeric bearing is greater when subjecting the grip to the first centrifugal force than when subjecting the grip to the second centrifugal force.

11. The method of claim 9, the bearing restraint comprising a polytetraflouroethylene surface facing the yoke such that the yoke contacts the polytetraflouroethylene surface when the rotor system is subject to the first centrifugal force.

12. The method of claim 9, further comprising draining condensation from the bearing restraint through a drain hole in the bearing restraint.

13. A helicopter, comprising:
a body;
a drive train;
a yoke coupled to the drive train;
a grip positioned around a portion of the yoke, the grip having a closed end and an open end;
a rotor blade;

at least one blade pin coupling the rotor blade to the grip;
an elastomeric bearing coupled to the closed end of the grip and located between the closed end and the yoke; and
a bearing restraint coupled to the grip between the yoke and the open end at a distance from the closed end such that the yoke contacts the bearing restraint when the rotor system is subject to a first centrifugal force but does not contact the bearing restraint when the rotor system is subject to a second centrifugal force greater than the first centrifugal force.

14. The helicopter of claim 13, the bearing restraint comprising a polytetraflouroethylene surface facing the yoke such that the yoke contacts the polytetraflouroethylene surface when the rotor system is subject to the first centrifugal force.

15. The helicopter of claim 13, further comprising at least one bolt coupling the bearing restraint to the grip.

16. The helicopter of claim 13, further comprising:
a mounting bracket;
a first bolt coupling the mounting bracket to the grip; and
a second bolt coupling the bearing restraint to the mounting bracket.

17. The helicopter of claim 13, wherein the second bolt couples the bearing restraint to the mounting bracket in a direction substantially parallel with the first centrifugal force.

18. The helicopter of claim 13, the bearing restraint further comprising a drain hole, the drain hole operable to reduce condensation in the bearing restraint.

19. The helicopter of claim 13, wherein:
the elastomeric bearing has a length measured from the closed end to the yoke; and
the length of the elastomeric bearing is greater when subjecting the grip to the first centrifugal force than when subjecting the grip to the second centrifugal force.

20. The helicopter of claim 13, further comprising a driveshaft coupling the drive train to the yoke, wherein the second centrifugal force is greater than the first centrifugal force when the drive train increases rotational speed of the driveshaft.

* * * * *

UNITED STATES PATENT AND TRADEMARK OFFICE
CERTIFICATE OF CORRECTION

| | | |
|---|---|---|
| PATENT NO. | : 8,695,918 B2 | Page 1 of 1 |
| APPLICATION NO. | : 13/346912 | |
| DATED | : April 15, 2014 | |
| INVENTOR(S) | : Chad L. Jarrett et al. | |

It is certified that error appears in the above-identified patent and that said Letters Patent is hereby corrected as shown below:

In the Claims

Column 6:
Claim 5, Line 15, delete "claim 1" and insert -- claim 4 --.
Claim 9, Line 45, between "such" and "subjecting," insert -- that --.

Column 8:
Claim 17, Line 3, delete "claim 13" and insert -- claim 16 --.

Signed and Sealed this
Twenty-first Day of April, 2015

Michelle K. Lee
*Director of the United States Patent and Trademark Office*